(12) United States Patent
Iwamoto

(10) Patent No.: US 8,325,383 B2
(45) Date of Patent: Dec. 4, 2012

(54) IMAGE READING DEVICE, AND METHOD FOR DRIVING THE SAME

(75) Inventor: Tsuyoshi Iwamoto, Nishinomiya (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1004 days.

(21) Appl. No.: 12/348,958

(22) Filed: Jan. 6, 2009

(65) Prior Publication Data
US 2009/0180161 A1 Jul. 16, 2009

(30) Foreign Application Priority Data

Jan. 15, 2008 (JP) .................................. 2008-005837

(51) Int. Cl.
*G06F 15/00* (2006.01)
*B41J 2/145* (2006.01)

(52) U.S. Cl. .......................................... 358/1.2; 347/41
(58) Field of Classification Search .................. 358/1.2, 358/1.9
See application file for complete search history.

(56) References Cited

U.S. PATENT DOCUMENTS
5,963,714 A * 10/1999 Bhattacharjya et al. ....... 358/1.9

FOREIGN PATENT DOCUMENTS
| JP | 10-224562 | 8/1998 |
| JP | 11-032168 | 2/1999 |
| JP | 2002-142078 A | 5/2002 |
| JP | 2007-336519 | 12/2007 |

OTHER PUBLICATIONS

Partial English Translation of an Office Action issued on Feb. 21, 2012 in corresponding Japanese Patent Application Serial No. JP 2008-005837.

* cited by examiner

*Primary Examiner* — Saeid Ebrahimi Dehkordy
(74) *Attorney, Agent, or Firm* — Cozen O'Connor

(57) ABSTRACT

A period when a relative movement between a document, and each of the pixel rows by a certain distance in the vertical direction is made is defined as a frame period, and the frame period is divided into a given number (i) of H periods. A certain H period is allocated as a readout period of each of the pixel rows so that each of the pixel rows reads an identical line of a document, depending on a vertical resolution set by a resolution setter.

9 Claims, 9 Drawing Sheets

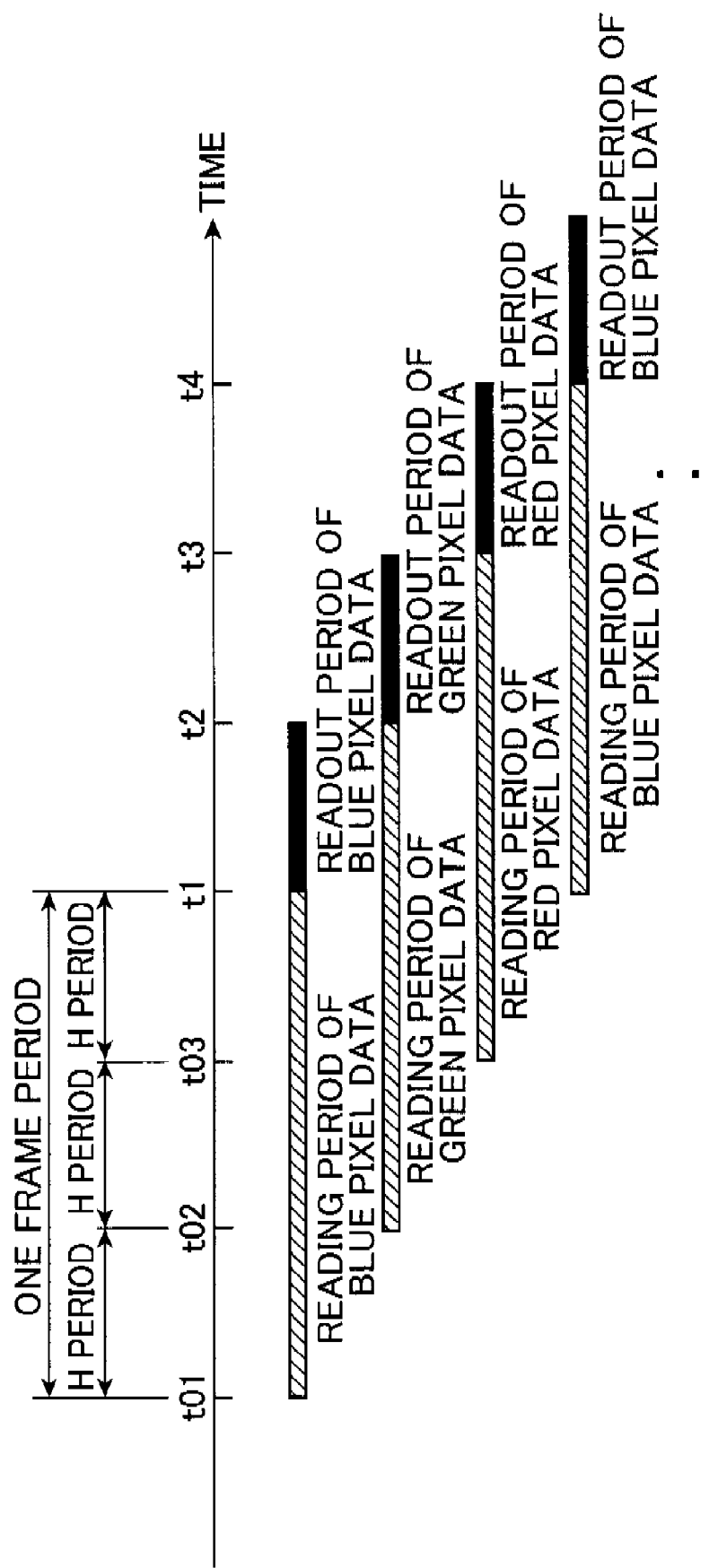

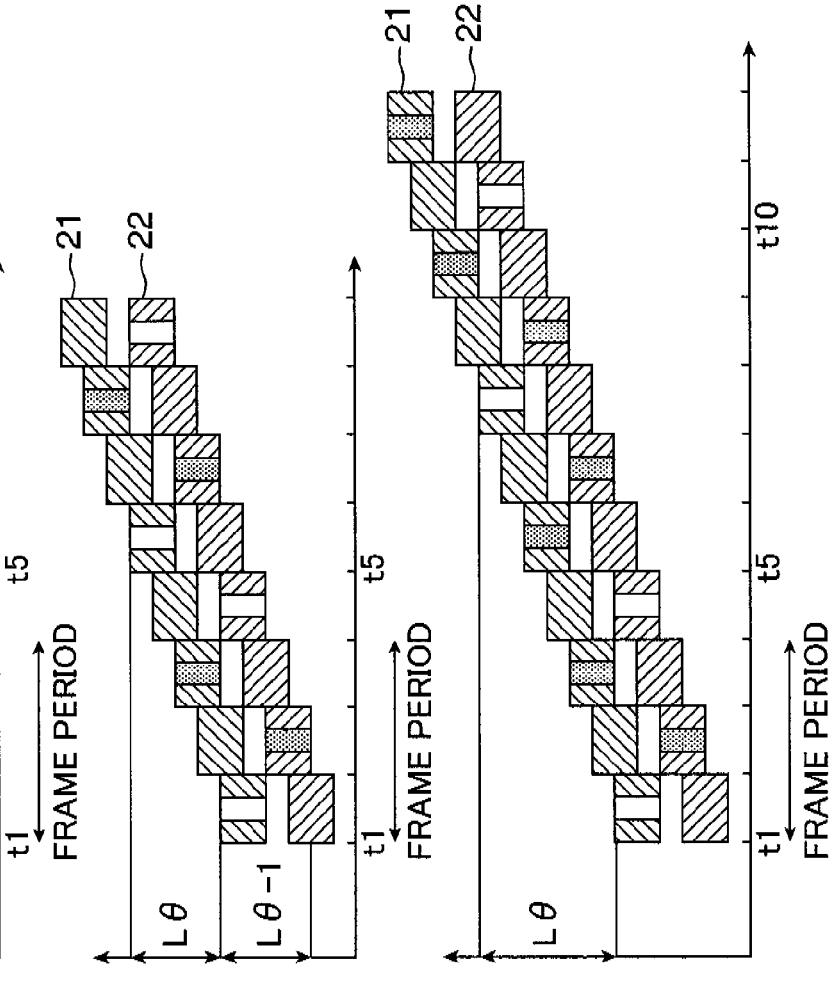

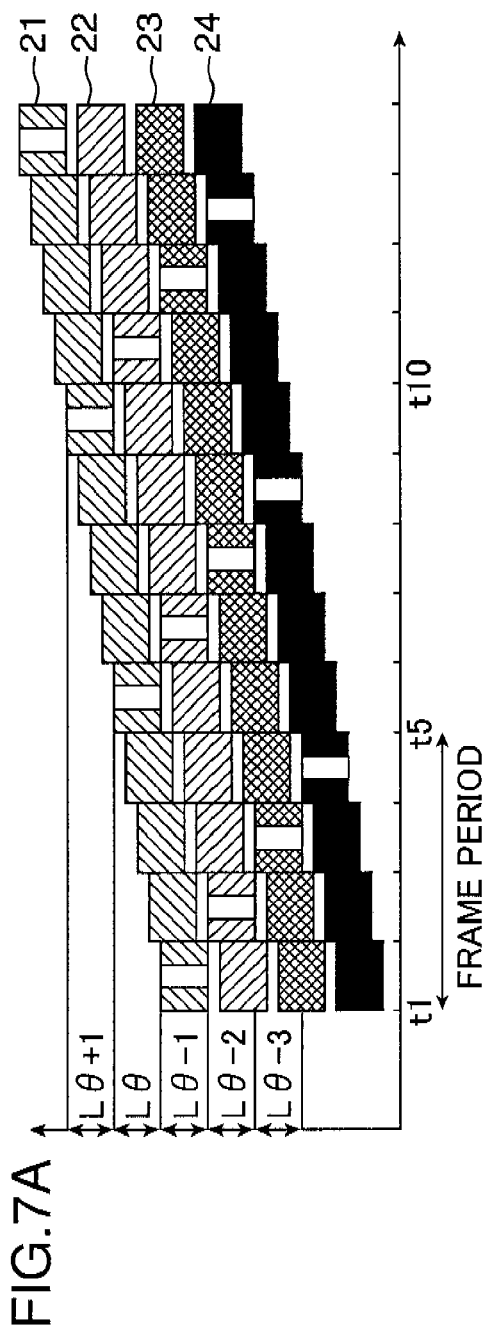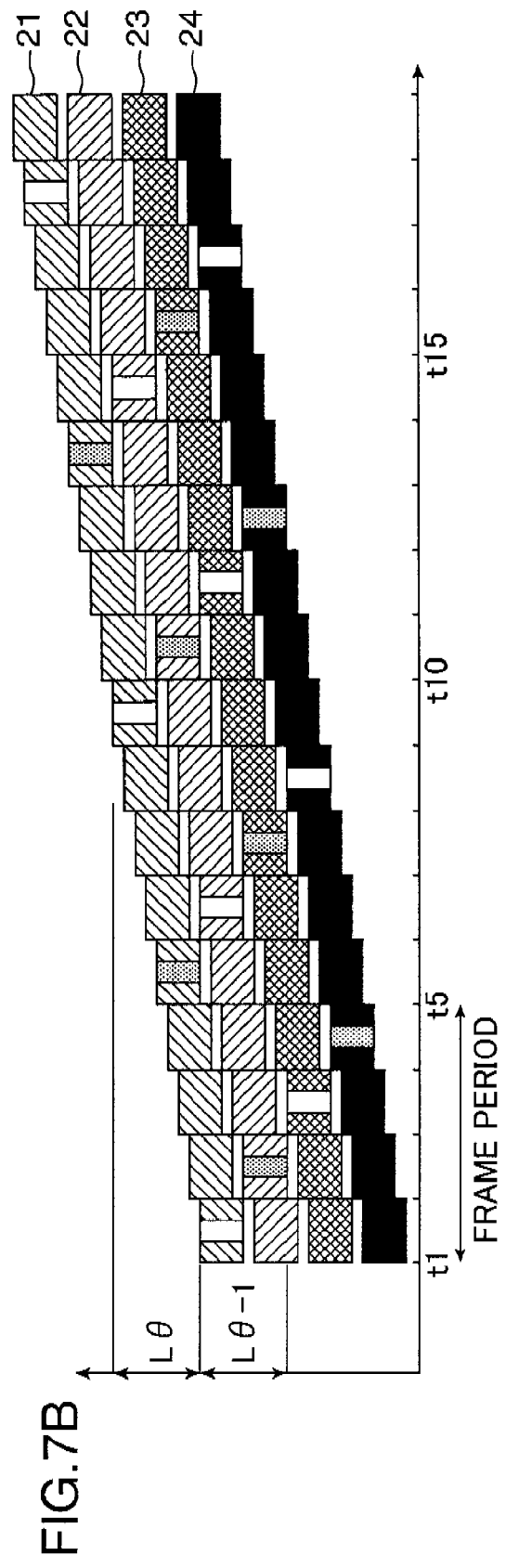

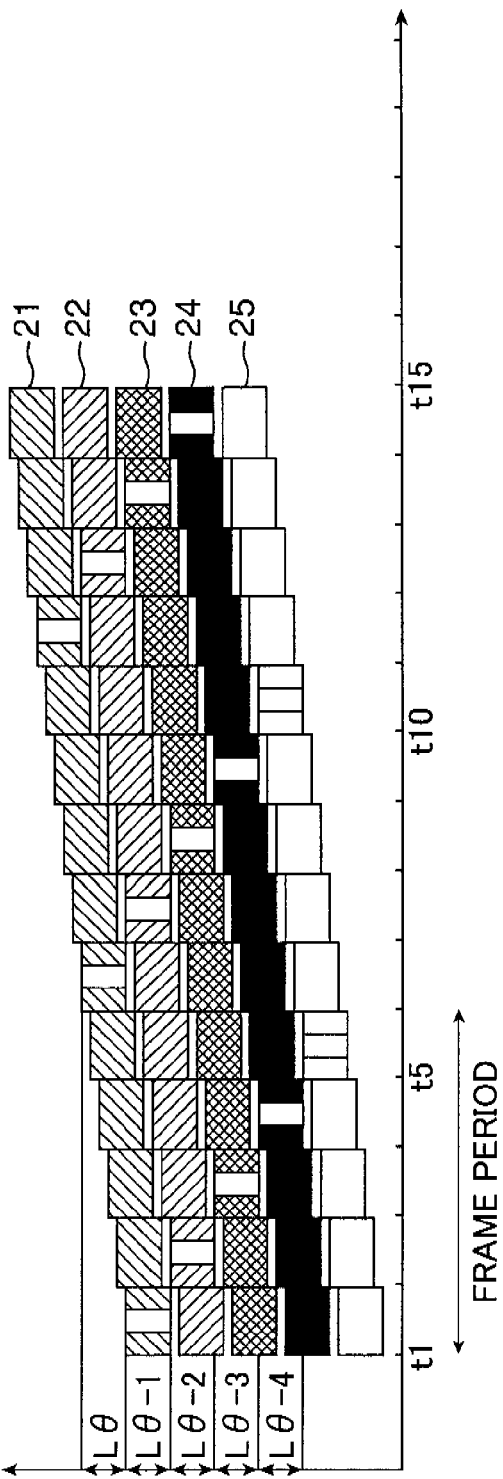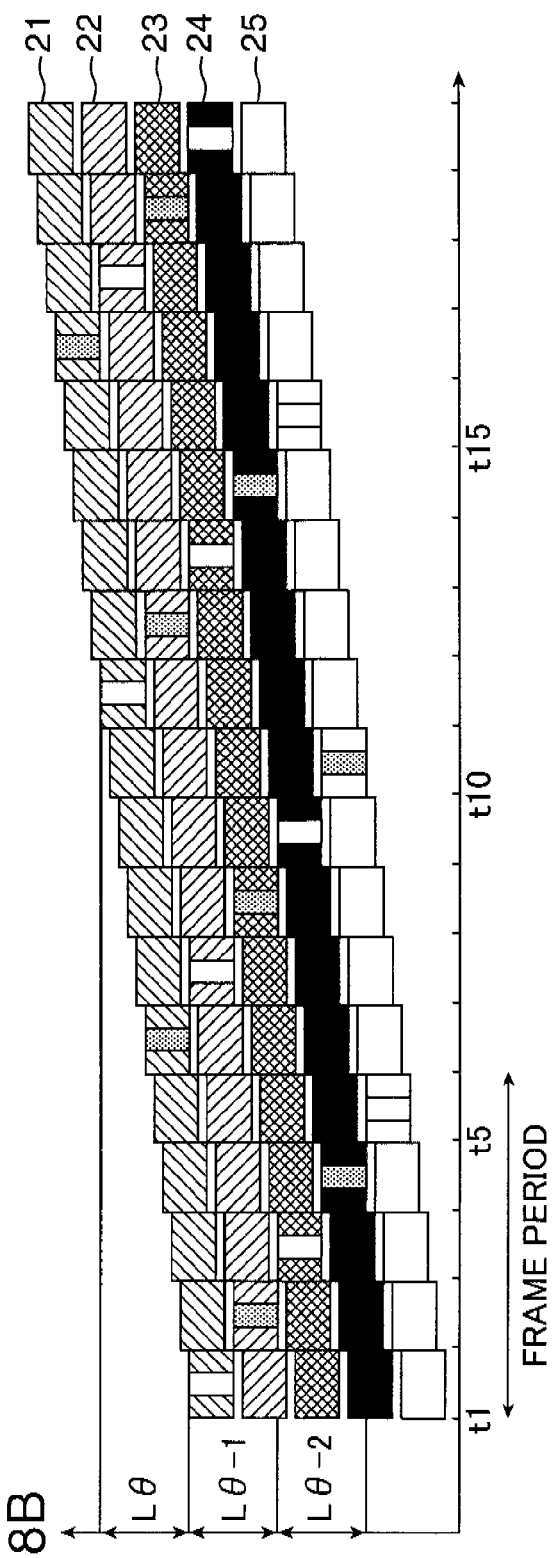

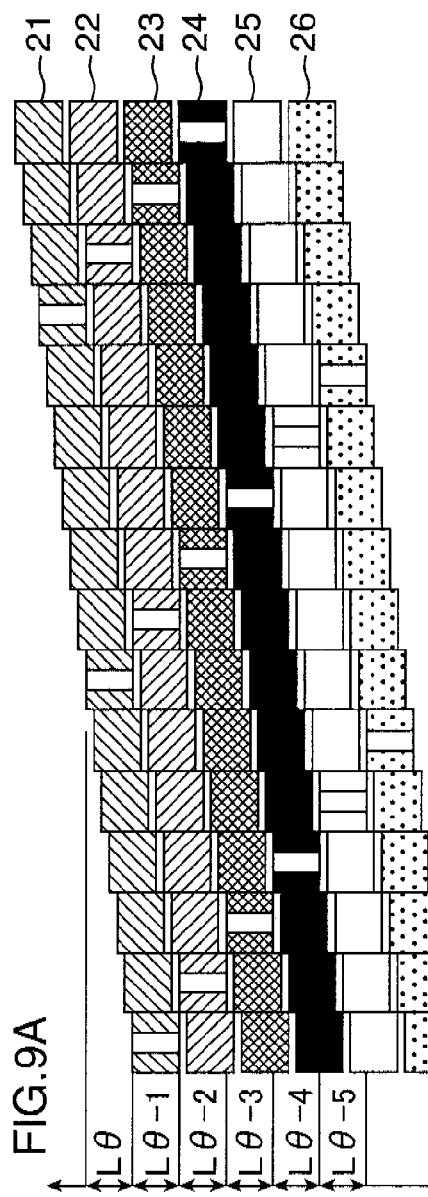
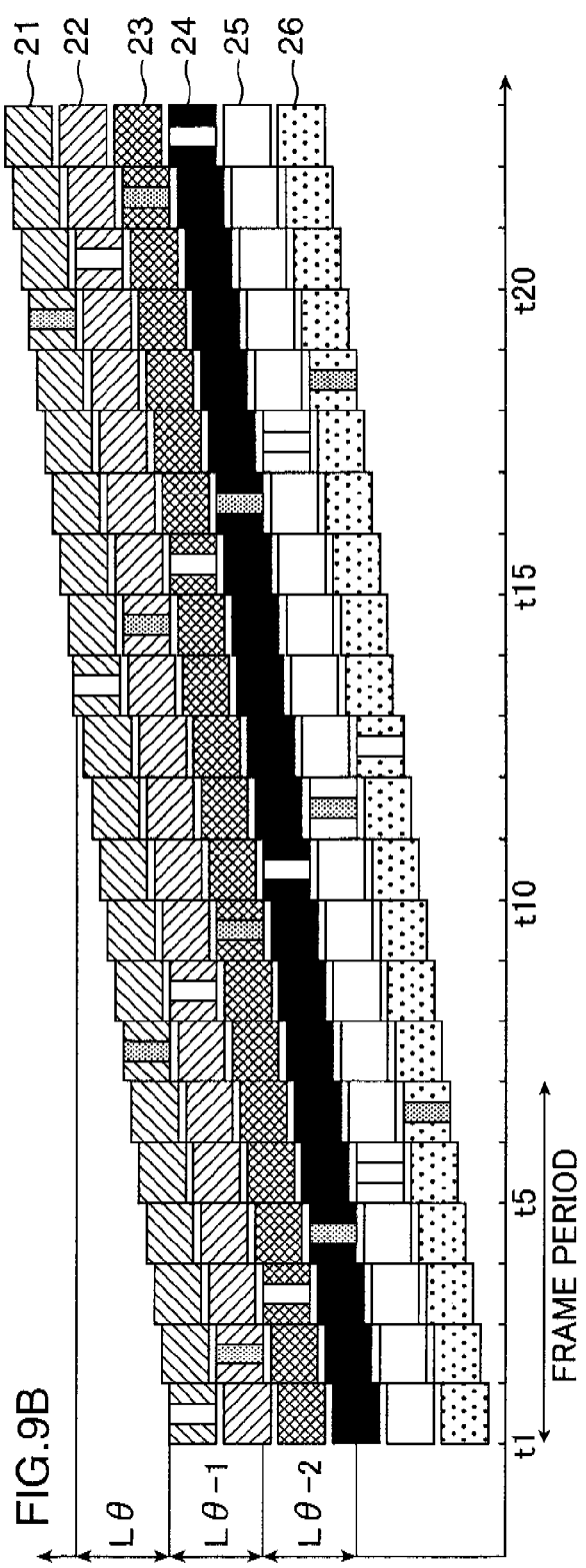
FIG.9A
FIG.9B

IMAGE READING DEVICE, AND METHOD FOR DRIVING THE SAME

This application is based on Japanese Patent Application No. 2008-5837 filed on Jan. 15, 2008, the contents of which are hereby incorporated by reference.

BACKGROUND OF THE INVENTION AND RELATED ART STATEMENT

1. Field of the Invention

The present invention relates to an image reading device provided with multiple pixel arrays, and a method for driving the image reading device.

2. Description of the Related Art

In recent years, there is known a solid-state image sensing device provided with pixel arrays arranged in the vertical direction, with each of the pixel arrays (hereinafter called as "pixel rows") being formed by arranging a number of pixels in the horizontal direction. The solid-state image sensing device is configured to acquire a color image by moving the pixel rows in the vertical direction with respect to a document. For instance, Japanese Unexamined Patent Publication No. 2002-142078 discloses a solid-state image sensing device capable of acquiring a monochromatic image at a high sensitivity and a high speed, as well as a color image, by transferring signal charges generated in the first through the third pixel rows having blue, green, and red filters, using a CCD register.

In recent years, there is also known a solid-state image sensing device for reading out image data obtained by multiple pixel rows with use of a readout circuit provided in common with respect to the pixel rows, without using a CCD register. The solid-state image sensing device is advantageous in reducing the pitch of the pixel rows in the vertical direction by the size corresponding to a CCD register.

In the above-mentioned solid-state image sensing device, the pitch of the pixel rows in a vertical direction is restricted. Further, it is required to control a readout timing of image data from the pixel rows by changing a vertical resolution while controlling the pitch of the pixel rows in order to read out image data without color displacement.

SUMMARY OF THE INVENTION

In view of the above, it is an object of the present invention to provide a technique capable of reading out image data without color displacement, even if a vertical resolution is changed.

An image reading device according to an aspect of the invention is an image reading device for scanning a document by causing a relative movement between the document, and a given number (i) of pixel rows, where i is an integer of 2 or larger, in a vertical direction orthogonal to a horizontal direction, each of the pixel rows being formed by arranging a certain number of pixels in the horizontal direction. Each of the pixel rows has a pitch in the vertical direction equal to or larger than $(i+1)/i$ of a size of an opening of the pixel in the vertical direction. The image reading device includes: a readout circuit, provided in common with respect to the pixel rows, for reading out image data; a resolution setter for setting a vertical resolution in scanning the document; and a controlling section for allocating a predetermined H period as a readout period of each of the pixel rows so that each of the pixel rows reads an identical line of the document, depending on the vertical resolution set by the resolution setter, assuming that a period when a relative movement of each of the pixel rows by a distance equal to the size of the opening of the pixel in the vertical direction is made is defined as one frame period, and the one frame period is divided into the given number (i) of H periods.

A method for driving an image reading device according to another aspect of the invention is a method for driving an image reading device for scanning a document by causing a relative movement between the document, and a given number (i) of pixel rows, where i is an integer of 2 or larger, in a vertical direction orthogonal to a horizontal direction, each of the pixel rows being formed by arranging a certain number of pixels in the horizontal direction. Each of the pixel rows has a pitch in the vertical direction equal to or larger than $(i+1)/i$ of a size of an opening of the pixel in the vertical direction. The image reading device includes a readout circuit, provided in common with respect to the pixel rows, for reading out image data. The method includes: a resolution setting step of setting a vertical resolution in scanning the document; and an allocating step of allocating a predetermined H period as a readout period of each of the pixel rows so that each of the pixel rows reads an identical line of the document, depending on the vertical resolution set in the resolution setting step, assuming that a period when a relative movement of each of the pixel rows by a distance equal to the size of the opening of the pixel in the vertical direction is made is defined as one frame period, and the one frame period is divided into the given number (i) of H periods.

These and other objects, features and advantages of the present invention will become more apparent upon reading the following detailed description along with the accompanying drawings.

BRIEF DESCRIPTION OF THE DRAWINGS

FIG. 2 is a timing chart on reading/readout operations of pixel rows in the case where a vertical resolution is set to a maximum value.

FIGS. 5A through 5C are graphs each showing a relation between lines to be read by three pixel rows, and a time, wherein FIG. 5A shows a case that the vertical resolution is set to one-half of the maximum value, FIG. 5B shows a case that the vertical resolution is set to one-third of the maximum value, and FIG. 5C shows a case that the vertical resolution is set to one-fourth of the maximum value.

FIGS. 6A through 6C are graphs each showing a relation between lines to be read by two pixel rows, and a time, wherein FIG. 6A shows a case that the vertical resolution is set to the maximum value, FIG. 6B shows a case that the vertical resolution is set to one-half of the maximum value, and FIG. 6C shows a case that the vertical resolution is set to one-third of the maximum value.

FIGS. 7A and 7B are graphs each showing a relation between lines to be read by four pixel rows, and a time, wherein FIG. 7A shows a case that the vertical resolution is set to the maximum value, and FIG. 7B shows a case that the vertical resolution is set to one-half of the maximum value.

FIGS. 8A and 8B are graphs each showing a relation between lines to be read by five pixel rows, and a time, wherein FIG. 8A shows a case that the vertical resolution is set to the maximum value, and FIG. 8B shows a case that the vertical resolution is set to one-half of the maximum value.

FIGS. 9A and 9B are graphs each showing a relation between lines to be read by six pixel rows, and a time, wherein FIG. 9A shows a case that the vertical resolution is set to the maximum value, and FIG. 9B shows a case that the vertical resolution is set to one-half of the maximum value.

DETAILED DESCRIPTION OF THE PREFERRED EMBODIMENTS OF THE INVENTION

Figure 1:
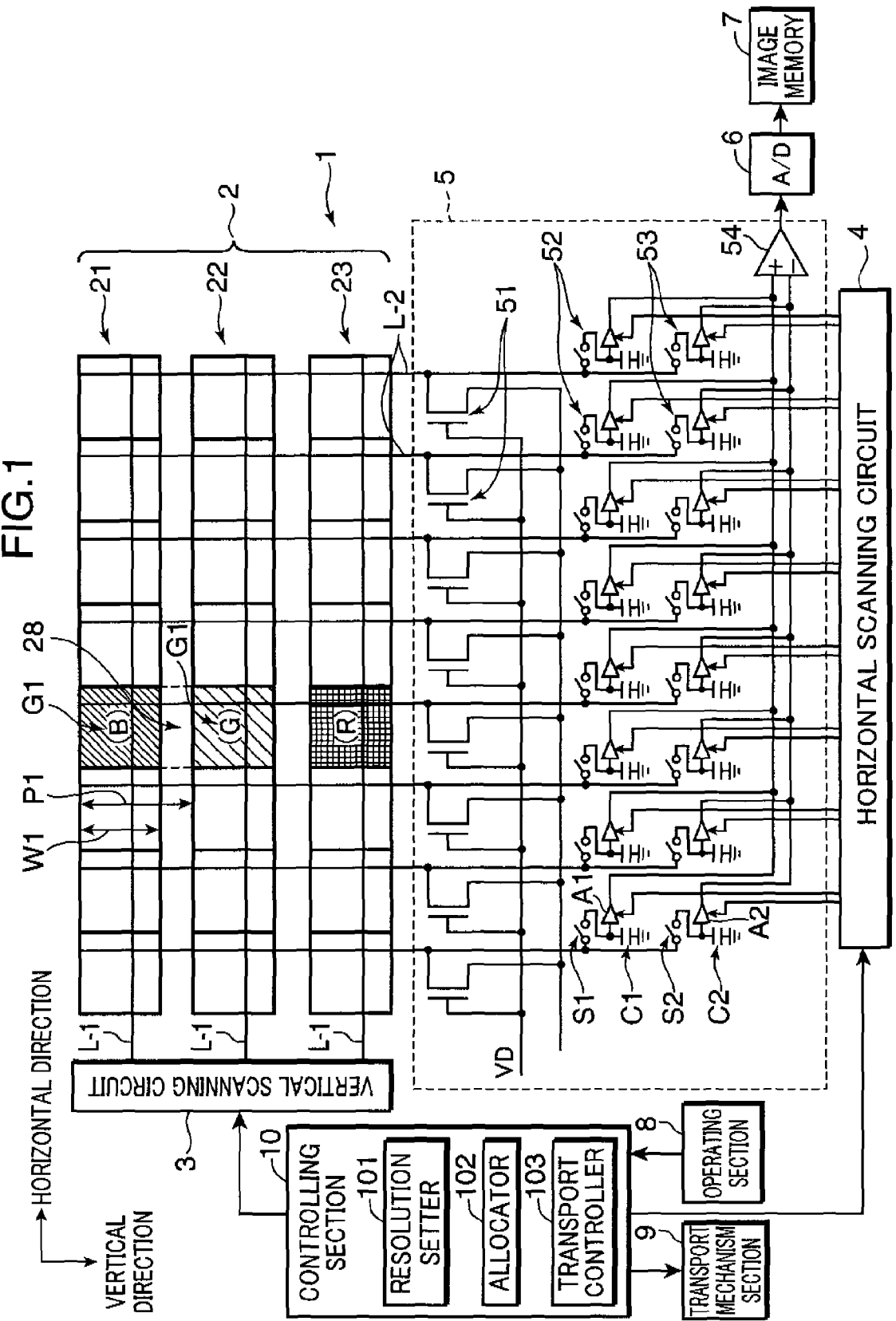
FIG. 1 is a diagram showing an entire arrangement of an image reading device embodying the invention.

In the following, an image reading device in accordance with an embodiment of the invention is described referring to the drawings. FIG. 1 is a diagram showing an entire arrangement of an image reading device 1 in accordance with the embodiment. As shown in FIG. 1, the image reading device 1 includes a solid-state image sensor provided with a sensing section 2, a vertical scanning circuit 3, a horizontal scanning circuit 4, and a readout circuit 5; an A/D converter 6; an image memory 7; an operating section 8; a transport mechanism section 9; and a controlling section 10. The image reading device 1 is configured in such a manner that a document is scanned by a relative movement between the document, and the solid-state image sensor in a vertical direction.

The sensing section 2 includes three rows of pixels 21, 22, and 23. Each of the pixel rows 21, 22, and 23 is a sensor, in which a certain number of pixels G1 are linearly arranged in a horizontal direction. As shown in FIG. 1, the pixel rows 21, 22, and 23 are arranged in this order in the vertical direction from an upper position to a lower position in a state that the pitch P1 in the vertical direction is set to four-thirds of the size W1 of an opening G11 (see FIGS. 3A through 3C) of each pixel G1 in the vertical direction, in other words, to satisfy the equation: $P1=(4/3)*W1$. Color filters of B (blue), G (green), and R (red) are attached to the openings G11 of the pixels G1 of the pixel rows 21, 22, and 23, respectively to read image data of B, G, and R.

The vertical scanning circuit 3 is connected to each of the pixel rows 21, 22, and 23 via a corresponding row selection signal line L-1. The vertical scanning circuit 3 is operable to cyclically select the row selection signals L-1 downwardly or upwardly in the vertical direction under the control of the controlling section 10 to vertically scan the pixel rows 21, 22, and 23. In this embodiment, the vertical scanning circuit 3 is constituted of a shift register. Alternatively, the vertical scanning circuit 3 may be constituted of a random access circuit.

The horizontal scanning circuit 4 is constituted of e.g. a shift register, and is operable to cyclically select vertical signal lines L-2 each connected to a column of pixels G1 e.g. in rightward direction to scan the pixels G1 in the horizontal direction. Specifically each of the vertical signal lines L-2 is connected to three pixels G1 aligned on an identical column, out of the pixels G1 constituting the pixel rows 21, 22, and 23.

The readout circuit 5 is a circuit for reading out image data from the pixel rows 21, 22, and 23 via the vertical signal lines L-2, and is provided in common with respect to the pixel rows 21, 22, and 23. In this embodiment, the readout circuit 5 includes constant current loads 51, signal sample-and-hold circuits 52, noise sample-and-hold circuits 53, and a difference amplifier 54. Each of the constant current loads 51, each of the signal sample-and-hold circuits 52, and each of the noise sample-and-hold circuits 53 are provided on the corresponding vertical signal line L-2. The constant current loads 51 each is constituted of e.g. an electric field effect transistor, and functions as a load upon application of a load voltage signal VD to a gate of the transistor under the control of the controlling section 10.

The signal sample-and-hold circuits 52 each includes a switch S1, a capacitor C1, and an amplifier A1. Each of the signal sample-and-hold circuits 52 is operable to sample-and-hold image data to be outputted from the corresponding pixels G1 under the control of the controlling section 10 by turning on and off the switch S1, charging the capacitor C1, holding a charged potential, and discharging the charge.

The noise sample-and-hold circuits 53 each is constituted of a switch S2, a capacitor C2, and an amplifier A2. Each of the noise sample-and-hold circuits 53 is operable to sample-and-hold a noise component in image data to be outputted from the corresponding pixels G1 under the control of the controlling section 10 by turning on and off the switch S2, charging the capacitor C2, holding a charged potential, and discharging the charge.

The difference amplifier 54 is operable to subtract a noise component which has been subjected to a sample-and-hold operation by the noise sample-and-hold circuit 53, from image data which has been subjected to a sample-and-hold operation by the signal sample-and-hold circuit 52 to remove noise from the image data.

The A/D converter 6 is operable to convert analog image data to be outputted from the difference amplifier 54 into digital image data, and output the digital image data to the image memory 7. The image memory 7 is operable to store image data to be outputted from the A/D converter 6. The operating section 8 is operable to accept an operation input from a user on various operations. In this embodiment, particularly, the operating section 8 is operable to accept an operation input for setting a vertical resolution. The transport mechanism section 9 includes a slide mechanism for slidably moving the solid-state image sensor in the vertical direction with respect to a document, and a motor for driving the slide mechanism. The transport mechanism section 9 is operable to move the solid-state image sensor under the control of a transport controller 103.

The controlling section 10 includes a microcomputer constituted of a CPU (central processing unit), an ROM (read only memory), and an RAM (random access memory), and controls the overall operations of the image reading device 1. In this embodiment, particularly, the controlling section 10 has functions of a resolution setter 101, an allocator 102, and the transport controller 103. These functions are realized by executing a program stored in an ROM by the CPU.

The resolution setter 101 is operable to set a vertical resolution in scanning a document in response to an operation input from the user through the operating section 8. In this embodiment, the resolution setter 101 is operable to set the vertical resolution to 1/m of a maximum value of the vertical resolution settable by the image reading device 1, in addition to the maximum value, where m is an integer of 2 or larger.

The allocator 102 is operable to allocate an H period as a readout period of each of the pixel rows 21, 22, and 23 so that each of the pixel rows 21, 22, and 23 is allowed to read an identical line (i.e. a frame) of a document, depending on the vertical resolution set by the vertical resolution setter 101, assuming that a period when each of the pixel rows 21, 22, and 23 is moved by a distance equal to the size W1 of the opening G11 of the pixel G1 in the vertical direction is defined as a frame period, and the frame period is divided into three H periods. The transport controller 103 controls the transport mechanism section 9 to move the solid-state image sensor in the vertical direction with respect to a document.

Figure 3A:
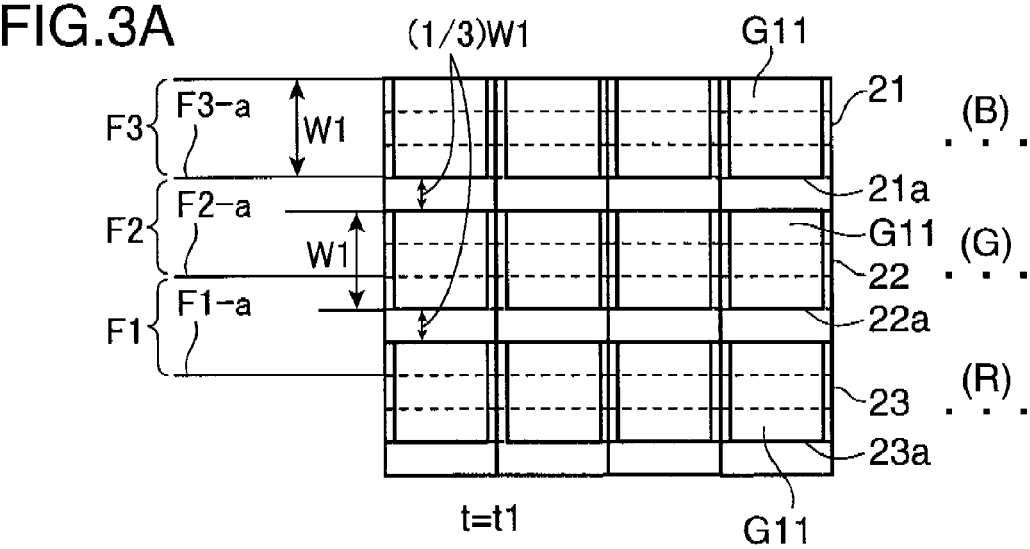
FIGS. 3A through 3C are diagrams for describing the timing chart shown in FIG. 2 in detail.
Figure 3B:
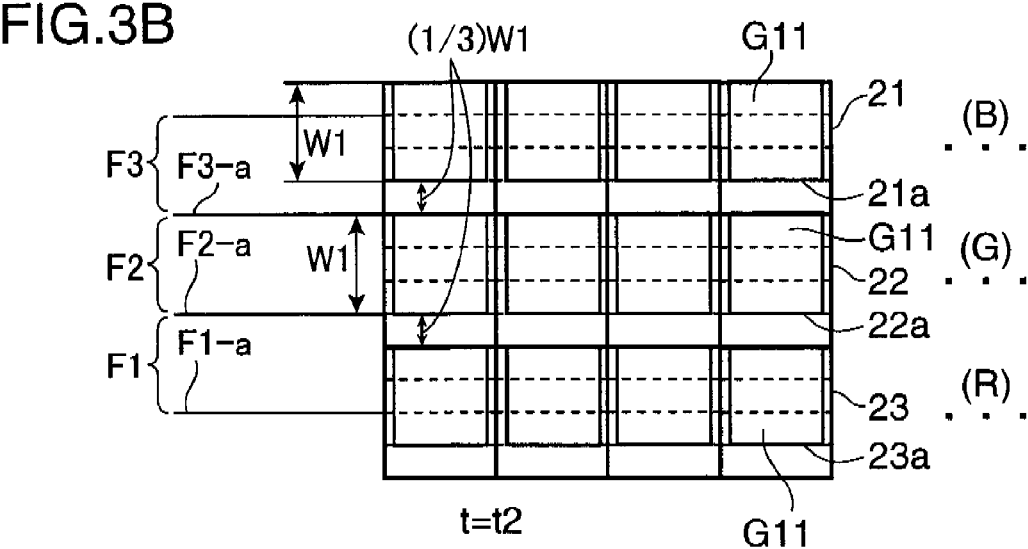
Figure 3C:
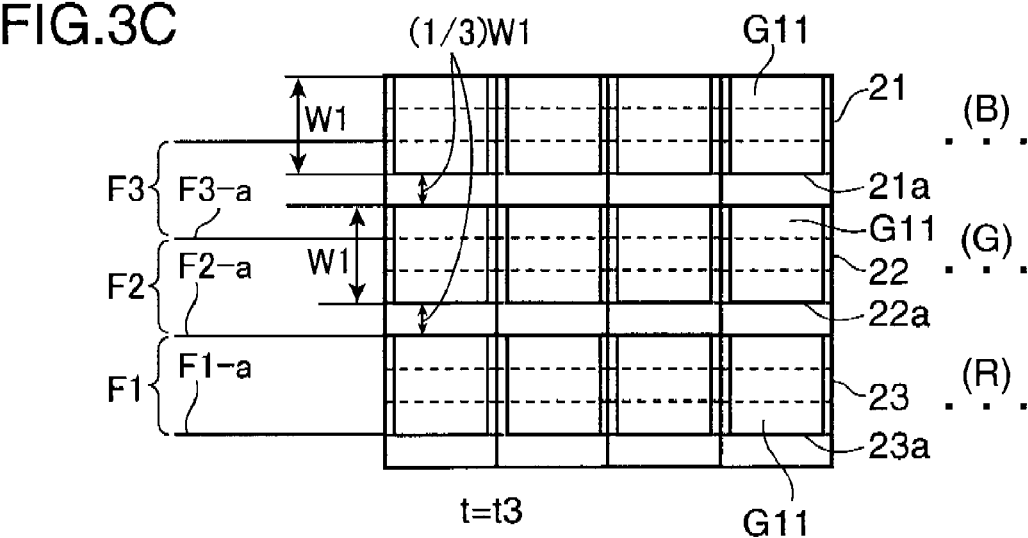

Next, an operation to be performed by the image reading device 1 shown in FIG. 1 is described. FIG. 2 is a timing chart of the solid-state image sensor, in the case where the resolution setter 101 sets the vertical resolution to the maximum value settable by the image reading device 1. FIGS. 3A through 3C are diagrams for describing the timing chart shown in FIG. 2 in detail. FIG. 3A shows the positions of the pixel rows 21, 22, and 23 at the point of time t1 in FIG. 2. FIG. 3B shows the positions of the pixel rows 21, 22, and 23 at the point of time t2 in FIG. 2. FIG. 3C shows the positions of the pixel rows 21, 22, and 23 at the point of time t3 in FIG. 2.

Referring to FIGS. 3A through 3C, F1, F2, and F3 each indicates a frame. In this example, the solid-state image sensor is moved upwardly in the vertical direction with respect to the frames F1, F2, and F3. In the specification, a frame indicates an area of a document to be read by each pixel row, while the pixel row is moved by the distance W1. A frame period indicates a time required for each pixel row to move by the distance W1. One H period indicates a time required for each pixel row to move by the distance (1/3)*W1. In this example, a frame period consists of three H periods.

In other words, assuming that a relative speed of the pixel row 21, 22, 23 with respect to a document is "v", one frame period is expressed by W1/v, and one H period is expressed by W1/(3*v).

Referring to FIG. 2, first, at the point of time t01, the pixel row 21 starts an operation of reading an image at the position of the frame F3, at the point of time t02, the pixel row 22 starts an operation of reading an image at the position of the frame F2, and at the point of time t03, the pixel row 23 starts an operation of reading an image at the position of the frame F1.

Subsequently, as shown in FIG. 3A, at the point of time t1 when a tail end 21a of openings G11 in the pixel row 21 has reached a tail end F3-a in the frame F3, as shown in FIG. 2, the allocator 102 allocates an H period from the point of time t1 to the point of time t2 as a readout period of the pixel row 21 to allow the pixel row 21 to output image data which has been obtained at the position of the frame F3 in the period from the point of time t01 to the point of time t1 to the readout circuit 5. At the point of time t1, the pixel row 21 starts an operation of reading an image at the position of a succeeding frame.

Then, as shown in FIG. 3B, at the point of time t2 when a tail end 22a of openings G11 in the pixel row 22 has reached a tail end F2-a in the frame F2, as shown in FIG. 2, the allocator 102 allocates an H period from the point of time t2 to the point of time t3 as a readout period of the pixel row 22 to allow the pixel row 22 to output image data which has been obtained at the position of the frame F2 in the period from the point of time t02 to the point of time t2 to the readout circuit 5. At the point of time t2, the pixel row 22 starts an operation of reading an image at the position of a succeeding frame i.e. the frame F3.

Then, as shown in FIG. 3C, at the point of time t3 when a tail end 23a of openings G11 in the pixel row 23 has reached a tail end F1-a in the frame F1, as shown in FIG. 2, the allocator 102 allocates an H period from the point of time t3 to the point of time t4 as a readout period of the pixel row 23 to allow the pixel row 23 to output image data which has been obtained at the position of the frame F1 in the period from the point of time t03 to the point of time t3 to the readout circuit 5. At the point of time t3, the pixel row 23 starts an operation of reading an image at the position of a succeeding frame i.e. the frame F2.

The following is a description on a reason why the pixel rows 21, 22, and 23 are arranged, with the interval of the opening G11 in the vertical direction being set equal to (1/3)*W1. If the pixel rows 21, 22, and 23 are arranged, with the interval of the opening G11 being set to a value smaller than (1/3)*W1, for instance, in FIG. 3B, the tail end F2-a in the frame F2 may reach the tail end 22a of the openings G11 in the pixel row 22 during a readout operation of image data which has been obtained at the position of the frame F3 by the pixel row 21. At this time, since the readout circuit 5 is used for the readout operation from the pixel row 21, the pixel row 22 is inoperable to output image data which has been obtained at the position of the frame F2 until the readout operation from the pixel row 21 is completed. As a result, the pixel row 22 is inoperable to read an image at the same frame position as the pixel row 21.

On the other hand, if the pixel rows 21, 22, and 23 are arranged, with the interval of the opening G11 being set equal to (1/3)*W1, for instance, in FIG. 3B, there is no likelihood that the tail end F2-a in the frame F2 may reach the tail end 22a of the openings G11 in the pixel row 22 during a readout operation of the image data which has been obtained at the position of the frame F3 by the pixel row 21. Accordingly, the pixel row 22 is operable to output image data obtained at the position of the frame F2 to the readout circuit 5. This allows the pixel rows 21, 22, and 23 to read an image at an identical frame position, thereby enabling to obtain image data without color displacement.

In this embodiment, the pixel rows 21, 22, and 23 are arranged, with the interval of the opening G11 in the vertical direction being set equal to (1/3)*W1. Alternatively, the pixel rows 21, 22, and 23 may be arranged, with the interval of the opening G11 in the vertical direction being set equal or larger than (1/3)*W1. The modification allows the pixel rows 21, 22, and 23 to read an image at an identical frame position, in the similar manner as the arrangement that the interval of the opening G11 is set equal to (1/3)*W1, by displacing the frame periods corresponding to the respective colors B, G, and R shown in FIG. 2 one from the other.

Figure 4:
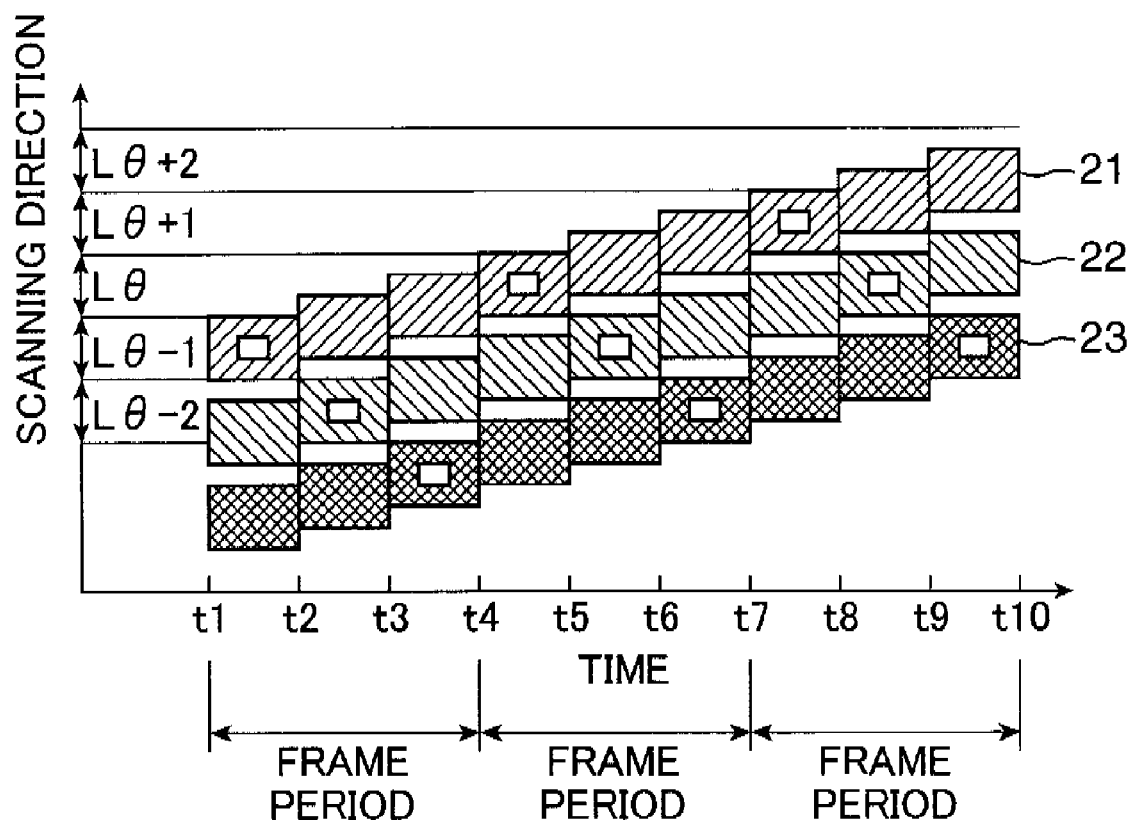
FIG. 4 is a graph showing a relation between lines to be read by three pixel rows, and a time, in the case where the vertical resolution is set to the maximum value.

FIG. 4 is a graph showing a relation between lines to be read by the pixel rows 21, 22, and 23, and a time, in the case where the vertical resolution is set to the maximum value. In FIG. 4, the axis of ordinate indicates a scanning direction, and the axis of abscissas indicates a time. In FIG. 4, rectangles indicate the positions of the pixel rows 21, 22, and 23 at the respective points of time indicated on the left sides thereof. The rectangles with blank areas indicate the pixel rows from which an image data readout operation is started. In FIG. 4, the symbol "θ" indicates the line number. In FIG. 4, since the vertical resolution is set to the maximum value, the vertical size of one line is identical to the vertical size of one frame.

Referring to FIG. 4, at the point of time t1, the pixel row 21 starts an operation of reading the line $L_\theta$. Then, at the point of time t2, the pixel row 22 starts an operation of reading the line $L_{\theta-1}$. Then, at the point of time t3, the pixel row 23 starts an operation of reading the line $L_{\theta-2}$.

At the point of time t4 upon lapse of one frame period after the point of time t1, the allocator 102 allocates an H period from the point of time t4 to the point of time t5, as a readout period of the pixel row 21, and the readout circuit 5 reads out image data corresponding to the line $L_\theta$ from the pixel row 21. Then, at the point of time t4, the pixel row 21 starts an operation of reading the line $L_{\theta+1}$.

Then, at the point of time t5, the allocator 102 allocates an H period from the point of time t5 to the point of time t6, as a readout period of the pixel row 22, and the readout circuit 5 reads out image data corresponding to the line $L_{\theta-1}$ from the pixel row 22. Then, at the point of time t5, the pixel row 22 starts an operation of reading the line $L_\theta$.

Then, at the point of time t6, the allocator 102 allocates an H period from the point of time t6 to the point of time t7, as a readout period of the pixel row 23, and the readout circuit 5 reads out image data corresponding to the line $L_{\theta-2}$ from the pixel row 23. Then, at the point of time t6, the pixel row 23 starts an operation of reading the line $L_{\theta-1}$.

As described above, the allocator 102 allocates the first through the third H periods in each of the frame periods, as the readout periods of the pixel rows 21, 22, and 23, respectively. This allows the pixel rows 21, 22, and 23 to read an image at an identical frame position, thereby enabling to obtain image data without color displacement.

Figure 5A:
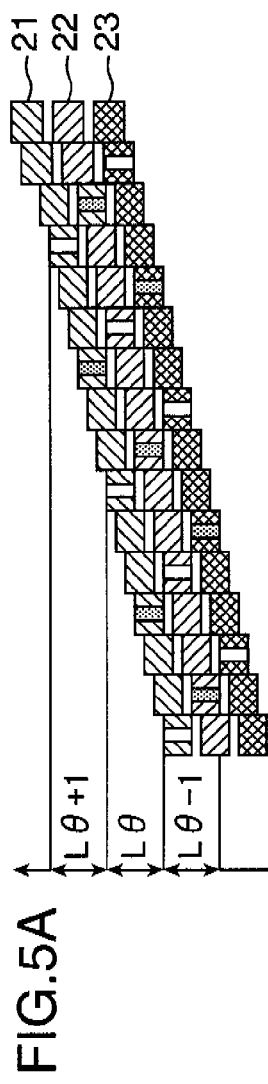
Figure 5B:
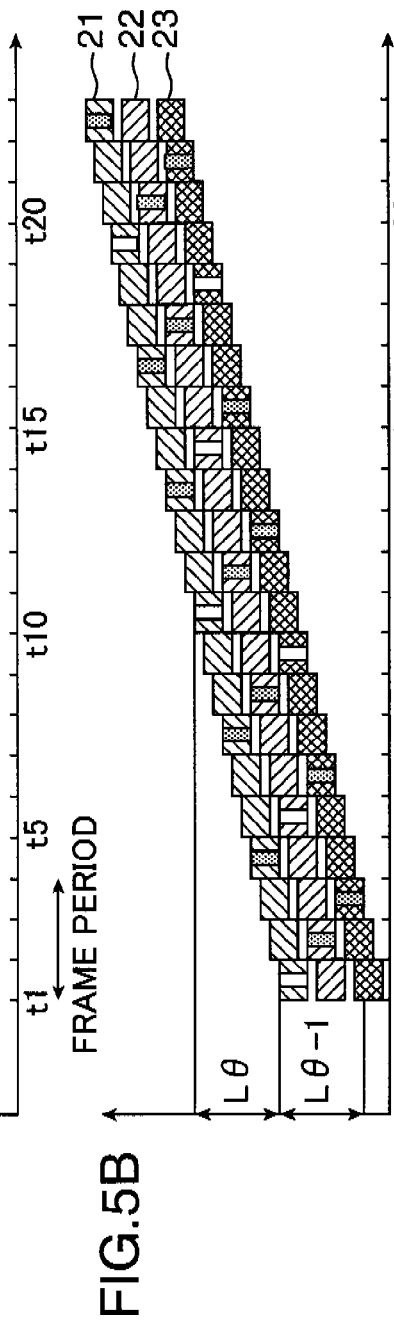
Figure 5C:
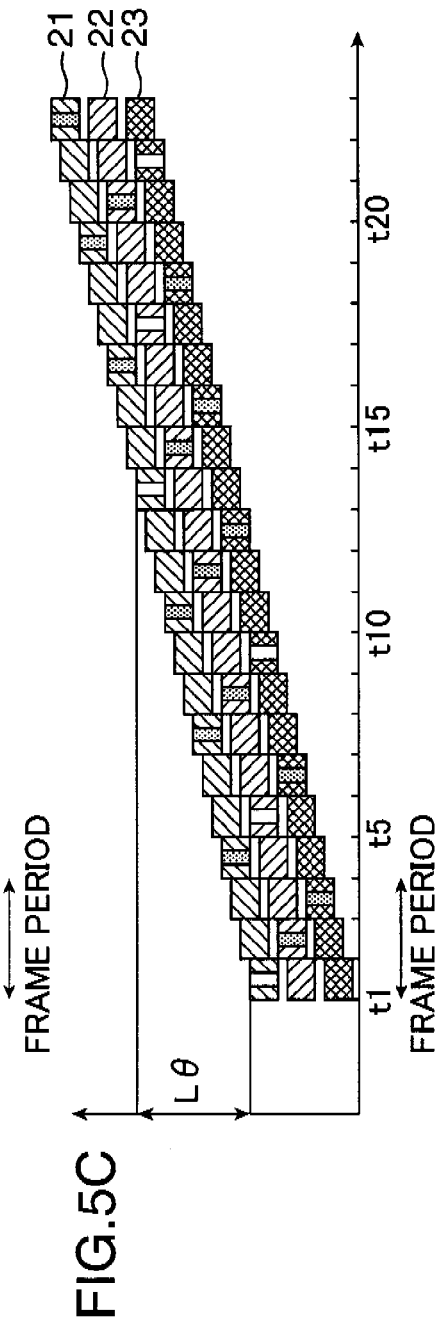

FIGS. 5A through 5C are graphs each showing a relation between lines to be read by the pixel rows 21, 22, and 23, and a time. FIG. 5A shows a case that the vertical resolution is set to one-half of the maximum value, FIG. 5B shows a case that the vertical resolution is set to one-third of the maximum value, and FIG. 5C shows a case that the vertical resolution is set to one-fourth of the maximum value. In FIGS. 5A through 5C, the axis of ordinate indicates a scanning direction, and the axis of abscissas indicates a time. In FIGS. 5A through 5C, the rectangles with dotted areas indicate pixel rows where a readout operation is skipped.

In FIG. 5A, since the vertical resolution is set to one-half of the maximum value, the vertical size of the line $L_\theta$ is two times of the vertical size of one frame. In FIG. 5B, since the vertical resolution is set to one-third of the maximum value, the vertical size of the line $L_\theta$ is three times of the vertical size of one frame. In FIG. 5C, since the vertical resolution is set to one-fourth of the maximum value, the vertical size of the line $L_\theta$ is four times of the vertical size of one frame.

Referring to FIG. 5A, at the point of time t1, since a lead end of the pixel row 21 is aligned with a tail end of the line $L_\theta$, the pixel row 21 starts an operation of reading the line $L_\theta$. In this example, since the vertical resolution is set to one-half of the maximum value, the allocator 102 allocates an H period from the point of time t7 to the point of time t8, as a succeeding readout period of the pixel row 21, in place of an H period from the point of time t4 to the point of time t5. Thereby, the pixel row 21 is allowed to read the line $L_\theta$ during six H periods from the point of time t1 to the point of time t7. Accordingly, the vertical size of the line $L_\theta$ is two times of the vertical size of the line $L_\theta$ in FIG. 4, and the vertical resolution is one-half of the vertical resolution in FIG. 4. Thereafter, the allocator 102 allocates every six H periods as a readout period of the pixel row 21 to allow the pixel row 21 to read a line whose vertical size is two times of the vertical size of the line in FIG. 4.

Referring to FIG. 5A, at the point of time t5, the pixel row 22 starts an operation of reading the line $L_\theta$. The allocator 102 allocates an H period from the point of time t11 to the point of time t12, as a readout period of the pixel row 22. In this example, the allocator 102 does not allocate an H period from the point of time t8 to the point of time t9, as a readout period of the pixel row 22, because the pixel row 22 during the H period from the point of time t8 to the point of time t9 is located in the line $L_\theta$. Thereafter, the allocator 102 allocates every six H periods as a readout period of the pixel row 22 to allow the pixel row 22 to read a line whose vertical size is two times of the vertical size of the line in FIG. 4.

Referring to FIG. 5A, at the point of time t3, since a lead end of the pixel row 23 is aligned with a tail end of the line $L_{\theta-1}$, the pixel row 23 starts an operation of reading the line $L_{\theta-1}$. The allocator 102 allocates an H period from the point of time t9 to the point of time t10, as a readout period of the pixel row 23. In this example, the allocator 102 does not allocate an H period from the point of time t6 to the point of time t7, as a readout period of the pixel row 23, because the pixel row 23 during the H period from the point of time t6 to the point of time t7 is located in the line $L_{\theta-1}$. Thereafter, the allocator 102 allocates every six H periods as a readout period of the pixel row 23 to allow the pixel row 23 to read a line whose vertical size is two times of the vertical size of the line in FIG. 4.

As described above, in the case where the vertical resolution is one-half of the maximum value, assuming that the period from the point of time t1 to the point of time t4 is defined as a first frame period, and the first H period in the first frame period is allocated as a readout period of the pixel row 21, allocating the first H period and the third H period in the (2j+1)-th frame period, where j is an integer of 0 or larger, as readout periods of the pixel rows 21 and 23, respectively, and allocating the second H period in the (2j+2)-th frame period as a readout period of the pixel row 22 enables to read an image at an identical frame position by the pixel rows 21, 22, and 23. Thereby, image data can be obtained without color displacement.

Next, described is a case where the vertical resolution is set to one-third of the maximum value, referring to FIG. 5B. Referring to FIG. 5B, at the point of time t1, since a lead end of the pixel row 21 is aligned with a tail end of the line $L_\theta$, the pixel row 21 starts an operation of reading the line $L_\theta$. In this example, since the vertical resolution is set to one-third of the maximum value, the allocator 102 allocates an H period from the point of time t10 to he point of time t11, as a succeeding readout period of the pixel row 21, in place of an H period from the point of time t4 to the point of time t5, and an H period from the point of time t7 to the point of time t8. Thereby, the pixel row 21 is allowed to read the line $L_\theta$ during nine H periods from the point of time t1 to the point of time t10. Accordingly, the vertical size of the line $L_\theta$ is three times of the vertical size of the line $L_\theta$ in FIG. 4, and the vertical resolution is one-third of the vertical resolution in FIG. 4. Thereafter, the allocator 102 allocates every nine H periods as a readout period of the pixel row 21 to allow the pixel row 21 to read a line whose vertical size is three times of the vertical size of the line in FIG. 4.

At the point of time t5, since a lead end of the pixel row 22 is aligned with the tail end of the line $L_\theta$, the pixel row 22 starts an operation of reading the line $L_\theta$. The allocator 102 allocates an H period from the point of time t14 to the point of time t15, as a readout period of the pixel row 22. In this example, the allocator 102 does not allocate an H period from the point of time t8 to the point of time t9, and an H period from the point of time t11 to the point of time t12, as a readout period of the pixel row 22, because the pixel row 22 during the H period from the point of time t8 to the point of time t9, and the H period from the point of time t11 to the point of time t12 is located in the line $L_\theta$. Thereafter, the allocator 102 allocates every nine H periods as a readout period of the pixel row 22 to allow the pixel row 22 to read a line whose vertical size is three times of the vertical size of the line in FIG. 4.

At the point of time t9, since a lead end of the pixel row 23 is aligned with the tail end of the line $L_\theta$, the pixel row 23 starts an operation of reading the line $L_\theta$. Thereafter, the allocator 102 allocates every nine H periods as a readout period of the pixel row 23 to allow the pixel row 23 to read a line whose vertical size is three times of the vertical size of the line in FIG. 4.

As described above, in the case where the vertical resolution is one-third of the maximum value, assuming that the period from the point of time t1 to the point of time t4 is defined as a first frame period, and the first H period in the first frame period is allocated as a readout period of the pixel row 21, allocating the first H period in the (3j+1)-th frame period, where j is an integer of 0 or larger, as a readout period of the pixel row 21, allocating the second H period in the (3j+2)-th frame period as a readout period of the pixel row 22, and allocating the third H period in the (3j+3)-th frame period as a readout period of the pixel row 23 enables to read an image at an identical frame position by the pixel rows 21, 22, and 23. Thereby, image data can be obtained without color displacement.

Next, described is a case where the vertical resolution is set to one-fourth of the maximum value, referring to FIG. 5C. Referring to FIG. 5C, at the point of time t1, since a lead end of the pixel row 21 is aligned with a tail end of the line $L_\theta$, the pixel row 21 starts an operation of reading the line $L_\theta$. In this example, since the vertical resolution is set to one-fourth of the maximum value, the allocator 102 allocates an H period from the point of time t13 to the point of time t14, as a succeeding readout period of the pixel row 21, in place of an H period from the point of time t4 to the point of time t5, an H period from the point of time t7 to the point of time t8, and an H period from the point of time t10 to the point of time t11. Thereby, the pixel row 21 is allowed to read the line $L_\theta$ during twelve H periods from the point of time t1 to the point of time t13. Accordingly, the vertical size of the line $L_\theta$ is four times of the vertical size of the line $L_\theta$ in FIG. 4, and the vertical resolution is one-fourth of the vertical resolution in FIG. 4. Thereafter, the allocator 102 allocates every twelve H periods as a readout period of the pixel row 21 to allow the pixel row 21 to read a line whose vertical size is four times of the vertical size of the line in FIG. 4.

At the point of time t5, since a lead end of the pixel row 22 is aligned with the tail end of the line $L_\theta$, the pixel row 22 starts an operation of reading the line $L_\theta$. The allocator 102 allocates an H period from the point of time t17 to the point of time t18, as a readout period of the pixel row 22. In this example, the allocator 102 does not allocate an H period from the point of time t8 to the point of time t9, an H period from the point of time t11 to the point of time t12, and an H period from the point of time t14 to the point of time t15, as a readout period of the pixel row 22, because the pixel row 22 during the H period from the point of time t8 to the point of time t9, the H period from the point of time t11 to the point of time t12, and the H period from the point of time t14 to the point of time t15 is located in the line $L_\theta$. Thereafter, the allocator 102 allocates every twelve H periods as a readout period of the pixel row 22 to allow the pixel row 22 to read a line whose vertical size is four times of the vertical size of the line in FIG. 4.

At the point of time t9, since a lead end of the pixel row 23 is aligned with the tail end of the line $L_\theta$, the pixel row 23 starts an operation of reading the line $L_\theta$. Thereafter, the allocator 102 allocates every twelve H periods as a readout period of the pixel row 23 to allow the pixel row 23 to read a line whose vertical size is four times of the vertical size of the line in FIG. 4.

As described above, in the case where the vertical resolution is one-fourth of the maximum value, assuming that the period from the point of time t1 to the point of time t4 is defined as a first frame period, and the first H period in the first frame period is allocated as a readout period of the pixel row 21, allocating the first H period in the (4j+1)-th frame period, where j is an integer of 0 or larger, as a readout period of the pixel row 21, allocating the second H period in the (4j+2)-th frame period as a readout period of the pixel row 22, and allocating the third H period in the (4j+3)-th frame period as a readout period of the pixel row 23, without allocating any H period in the (4j+4)-th frame period as a readout period of the pixel rows 21, 22, and 23 enables to read an image at an identical frame position by the pixel rows 21, 22, and 23. Thereby, image data can be obtained without color displacement.

Arrangement with Two Pixel Rows

In this section, described is an arrangement in the case where the image reading device 1 has two pixel rows i.e. pixel rows 21 and 22. FIGS. 6A through 6C are graphs each showing a relation between lines to be read by the pixel rows 21 and 22, and a time. FIG. 6A shows a case that the vertical resolution is set to the maximum value, FIG. 6B shows a case that the vertical resolution is set to one-half of the maximum value, and FIG. 6C shows a case that the vertical resolution is set to one-third of the maximum value. In this arrangement, one frame period consists of two H periods.

In FIG. 6A, since the vertical resolution is set to the maximum value, the vertical size of the line $L_\theta$ is equal to the vertical size of one frame. In FIG. 6B, since the vertical resolution is set to one-half of the maximum value, the vertical size of the line $L_\theta$ is two times of the vertical size of one frame. In FIG. 6C, since the vertical resolution is set to one-third of the maximum value, the vertical size of the line $L_\theta$ is three times of the vertical size of one frame.

Referring to FIG. 6A, at the point of time t1, the pixel row 21 starts an operation of reading the line $L_\theta$, and at the point of time t2, the pixel row 22 starts an operation of reading the line $L_{\theta-1}$.

At the point of time t3 upon lapse of one frame period after the point of time t1, the allocator 102 allocates an H period from the point of time t3 to the point of time t4, as a readout period of the pixel row 21, and the readout circuit 5 reads out image data corresponding to the line $L_\theta$ from the pixel row 21. At the point of time t3, the pixel row 21 starts an operation of reading the line $L_{\theta+1}$.

Then, at the point of time t4, the allocator 102 allocates an H period from the point of time t4 to the point of time t5, as a readout period of the pixel row 22, and the readout circuit 5 reads out image data corresponding to the line $L_{\theta-1}$ from the pixel row 22. At the point of time t4, the pixel row 22 starts an operation of reading the line $L_\theta$.

As described above, the allocator 102 allocates the first H period and the second H period in each of the frame periods, as readout periods of the pixel rows 21 and 22, respectively. This allows the pixel rows 21 and 22 to read an image at an identical frame position, thereby enabling to obtain image data without color displacement.

Next, described is a case where the vertical resolution is set to one-half of the maximum value, referring to FIG. 6B. Referring to FIG. 6B, at the point of time t1, since a lead end of the pixel row 21 is aligned with a tail end of the line $L_\theta$, the pixel row 21 starts an operation of reading the line $L_\theta$. In this example, since the vertical resolution is set to one-half of the maximum value, the allocator 102 allocates an H period from the point of time t5 to the point of time t6, as a succeeding readout period of the pixel row 21, in place of an H period from the point of time t3 to the point of time t4. Thereby, the pixel row 21 is allowed to read the line $L_\theta$ during four H periods from the point of time t1 to the point of time t5. Accordingly, the vertical size of the line $L_\theta$ is two times of the vertical size of the line $L_\theta$ in FIG. 6A, and the vertical resolution is one-half of the vertical resolution in FIG. 6A. Thereafter, the allocator 102 allocates every four H periods as a readout period of the pixel row 21 to allow the pixel row 21 to read a line whose vertical size is two times of the vertical size of the line in FIG. 6A.

At the point of time t4, since a lead end of the pixel row 22 is aligned with the tail end of the line $L_\theta$, the pixel row 22 starts an operation of reading the line $L_\theta$. The allocator 102 allocates an H period from the point of time t8 to the point of time t9, as a readout period of the pixel row 22, and the readout circuit 5 reads out image data corresponding to the line $L_\theta$ from the pixel row 22. In this example, the allocator 102 does not allocate an H period from the point of time t6 to the point of time t7, as a readout period of the pixel row 22, because the pixel row 22 during the H period from the point of time t6 to the point of time t7 is located in the line $L_\theta$. Thereafter, the allocator 102 allocates every four H periods as a readout period of the pixel row 22 to allow the pixel row 22 to read a line whose vertical size is two times of the vertical size of the line in FIG. 6A.

As described above, in the case where the vertical resolution is one-half of the maximum value, assuming that the period from the point of time t1 to the point of time t3 is defined as a first frame period, and the first H period in the first frame period is allocated as a readout period of the pixel row 21, allocating the first H period in the (2j+1)-th frame period, where j is an integer of 0 or larger, as a readout period of the pixel row 21, and allocating the second H period in the (2j+2)-th frame period as a readout period of the pixel row 22 enables to read an image at an identical frame position by the pixel rows 21 and 22. Thereby, image data can be obtained without color displacement.

Next, described is a case where the vertical resolution is set to one-third of the maximum value, referring to FIG. 6C. Referring to FIG. 6C, at the point of time t1, since a lead end of the pixel row 21 is aligned with a tail end of the line $L_\theta$, the pixel row 21 starts an operation of reading the line $L_\theta$. In this example, since the vertical resolution is set to one-third of the maximum value, the allocator 102 allocates an H period from the point of time t7 to the point of time t8, as a succeeding readout period of the pixel row 21, in place of an H period from the point of time t3 to the point of time t4, and an H period from the point of time t5 to the point of time t6. Thereby, the pixel row 21 is allowed to read the line $L_\theta$ during six H periods from the point of time t1 to the point of time t7. Accordingly, the vertical size of the line $L_\theta$ is three times of the vertical size of the line $L_\theta$ in FIG. 6A, and the vertical resolution is one-third of the vertical resolution in FIG. 6A. Thereafter, the allocator 102 allocates every six H periods as a readout period of the pixel row 21 to allow the pixel row 21 to read a line whose vertical size is three times of the vertical size of the line in FIG. 6A.

At the point of time t4, since a lead end of the pixel row 22 is aligned with the tail end of the line $L_\theta$, the pixel row 22 starts an operation of reading the line $L_\theta$. The allocator 102 allocates an H period from the point of time t10 to the point of time t11, as a readout period of the pixel row 22, and the readout circuit 5 reads out image data corresponding to the line $L_\theta$ from the pixel row 22. In this example, the allocator 102 does not allocate an H period from the point of time t6 to the point of time t7, and an H period from the point of time t8 to the point of time t9, as a readout period of the pixel row 22, because the pixel row 22 during the H period from the point of time t6 to the point of time t7, and the H period from the point of time t8 to the point of time t9 is located in the line $L_\theta$. Thereafter, the allocator 102 allocates every six H periods as a readout period of the pixel row 22 to allow the pixel row 22 to read a line whose vertical size is three times of the vertical size of the line in FIG. 6A.

As described above, in the case where the vertical resolution is one-third of the maximum value, assuming that the period from the point of time t1 to the point of time t3 is defined as a first frame period, and the first H period in the first frame period is allocated as a readout period of the pixel row 21, allocating the first H period in the (3j+1)-th frame period, where j is an integer of 0 or larger, as a readout period of the pixel row 21, and allocating the second H period in the (3j+2)-th frame period as a readout period of the pixel row 22, without allocating any H period in the (3j+3)-th frame period as a readout period of the pixel rows 21 and 22 enables to read an image at an identical frame position by the pixel rows 21 and 22. Thereby, image data can be obtained without color displacement.

Arrangement with Four Pixel Rows

In this section, described is an arrangement in the case where the image reading device 1 has four pixel rows i.e. pixel rows 21, 22, 23, and 24. FIGS. 7A and 7B are graphs each showing a relation between lines to be read by the pixel rows 21 through 24, and a time. FIG. 7A shows a case that the vertical resolution is set to the maximum value, and FIG. 7B shows a case that the vertical resolution is set to one-half of the maximum value. In this arrangement, one frame period consists of four H periods.

In FIG. 7A, since the vertical resolution is set to the maximum value, the vertical size of the line $L_\theta$ is equal to the vertical size of one frame. In FIG. 7B, since the vertical resolution is set to one-half of the maximum value, the vertical size of the line $L_\theta$ is two times of the vertical size of one frame.

Referring to FIG. 7A, at the point of time t1, the pixel row 21 starts an operation of reading the line $L_\theta$, at the point of time t2, the pixel row 22 starts an operation of reading the line $L_{\theta-1}$, at the point of time t3, the pixel row 23 starts an operation of reading the line $L_{\theta-2}$, and at the point of time t4, the pixel row 24 starts an operation of reading the line $L_{\theta-3}$.

At the point of time t5 upon lapse of one frame period after the point of time t1, the allocator 102 allocates an H period from the point of time t5 to the point of time t6, as a readout period of the pixel row 21, and the readout circuit 5 reads out image data corresponding to the line $L_\theta$ from the pixel row 21. At the point of time t5, the pixel row 21 starts an operation of reading the line $L_{\theta+1}$.

Then, at the point of time t6, the allocator 102 allocates an H period from the point of time t6 to the point of time t7, as a readout period of the pixel row 22, and the readout circuit 5 reads out image data corresponding to the line $L_{\theta-1}$ from the pixel row 22. At the point of time t6, the pixel row 22 starts an operation of reading the line $L_\theta$.

The allocator 102 allocates a readout period of the pixel rows 23 and 24 in the similar manner as the pixel rows 21 and 22.

As described above, the allocator 102 allocates the first through the fourth H periods in each of the frame periods, as readout periods of the pixel rows 21 through 24, respectively. This allows the pixel rows 21 through 24 to read an image at an identical frame position, thereby, enabling to obtain image data without color displacement.

Next, described is a case where the vertical resolution is set to one-half of the maximum value, referring to FIG. 7B. Referring to FIG. 7B, at the point of time t1, since a lead end of the pixel row 21 is aligned with a tail end of the line $L_\theta$, the pixel row 21 starts an operation of reading the line $L_\theta$. In this example, since the vertical resolution is set to one-half of the maximum value, the allocator 102 allocates an H period from the point of time t9 to the point of time t10, as a succeeding readout period of the pixel row 21, in place of an H period from the point of time t5 to the point of time t6. Thereby, the pixel row 21 is allowed to read the line $L_\theta$ during eight H periods from the point of time t1 to the point of time t9. Accordingly, the vertical size of the line $L_\theta$ is two times of the vertical size of the line $L_\theta$ in FIG. 7A, and the vertical resolution is one-half of the vertical resolution in FIG. 7A. Thereafter, the allocator 102 allocates every eight H periods as a readout period of the pixel row 21 to allow the pixel row 21 to read a line whose vertical size is two times of the vertical size of the line in FIG. 7A.

At the point of time t6, since a lead end of the pixel row 22 is aligned with the tail end of the line $L_\theta$, the pixel row 22 starts an operation of reading the line $L_\theta$. The allocator 102 allocates an H period from the point of time t14 to the point of time t15, as a readout period of the pixel row 22, and the readout circuit 5 reads out image data corresponding to the line $L_\theta$ from the pixel row 22. In this example, the allocator 102 does not allocate an H period from the point of time t10 to the point of time t11, as a readout period of the pixel row 22, because the pixel row 22 during the H period from the point of time t10 to the point of time t11 is located in the line $L_\theta$. Thereafter, the allocator 102 allocates every eight H periods as a readout period of the pixel row 22 to allow the pixel row 22 to read a line whose vertical size is two times of the vertical size of the line in FIG. 7A.

The allocator 102 allocates every eight H periods as a readout period of the pixel rows 23 and 24 in the similar manner as the pixel rows 21 and 22.

As described above, in the case where the vertical resolution is one-half of the maximum value, assuming that the period from the point of time t1 to the point of time t5 is defined as a first frame period, and the first H period in the first frame period is allocated as a readout period of the pixel row 21, allocating the first H period and the third H period in the (2j+1)-th frame period, where j is an integer of 0 or larger, as readout periods of the pixel rows 21 and 23, respectively, and allocating the second H period and the fourth H period in the (2j+2)-th frame period as readout periods of the pixel rows 22 and 24, respectively enables to read an image at an identical frame position by the pixel rows 21 through 24. Thereby, image data can be obtained without color displacement.

Arrangement with Five Pixel Rows

In this section, described is an arrangement in the case where the image reading device 1 has five pixel rows i.e. pixel rows 21, 22, 23, 24, and 25. FIGS. 8A and 8B are graphs each showing a relation between lines to be read by the pixel rows 21 through 25, and a time. FIG. 8A shows a case that the vertical resolution is set to the maximum value, and FIG. 8B shows a case that the vertical resolution is set to one-half of the maximum value. In this arrangement, one frame period consists of five H periods.

In FIG. 8A, since the vertical resolution is set to the maximum value, the vertical size of the line $L_\theta$ is equal to the vertical size of one frame. In FIG. 8B, since the vertical resolution is set to one-half of the maximum value, the vertical size of the line $L_\theta$ is two times of the vertical size of one frame.

Referring to FIG. 8A, at the point of time t1, the pixel row 21 starts an operation of reading the line $L_\theta$, at the point of time t2, the pixel row 22 starts an operation of reading the line $L_{\theta-1}$, at the point of time t3, the pixel row 23 starts an operation of reading the line $L_{\theta-2}$, at the point of time t4, the pixel row 24 starts an operation of reading the line $L_{\theta 3}$, and at the point of time t5, the pixel row 25 starts an operation of reading the line $L_{\theta-4}$.

At the point of time t6 upon lapse of one frame period after the point of time t1, the allocator 102 allocates an H period from the point of time t6 to the point of time t7, as a readout period of the pixel row 21, and the readout circuit 5 reads out image data corresponding to the line $L_\theta$ from the pixel row 21. At the point of time t6, the pixel row 21 starts an operation of reading the line $L_{\theta+1}$.

Then, at the point of time t7, the allocator 102 allocates an H period from the point of time t7 to the point of time t8, as a readout period of the pixel row 22, and the readout circuit 5 reads out image data corresponding to the line $L_{\theta-1}$ from the pixel row 22. At the point of time t7, the pixel row 22 starts an operation of reading the line $L_\theta$.

The allocator 102 allocates a readout period of the pixel rows 23 through 25 in the similar manner as the pixel rows 21 and 22.

As described above, the allocator 102 allocates the first through the fifth H periods in each of the frame periods, as readout periods of the pixel rows 21 through 25, respectively. This allows the pixel rows 21 through 25 to read an image at an identical frame position, thereby enabling to obtain image data without color displacement.

Next, described is a case where the vertical resolution is set to one-half of the maximum value, referring to FIG. 8B. Referring to FIG. 8B, at the point of time t1, since a lead end of the pixel row 21 is aligned with a tail end of the line $L_\theta$, the pixel row 21 starts an operation of reading the line $L_\theta$. In this example, since the vertical resolution is set to one-half of the maximum value, the allocator 102 allocates an H period from the point of time t11 to the point of time t12, as a succeeding readout period of the pixel row 21, in place of an H period from the point of time t6 to the point of time t7. Thereby, the pixel row 21 is allowed to read the line $L_\theta$ during ten H periods from the point of time t1 to the point of time t11. Accordingly, the vertical size of the line $L_\theta$ is two times of the vertical size of the line $L_\theta$ in FIG. 8A, and the vertical resolution is one-half of the vertical resolution in FIG. 8A. Thereafter, the allocator 102 allocates every ten H periods as a readout period of the pixel row 21 to allow the pixel row 21 to read a line whose vertical size is two times of the vertical size of the line in FIG. 8A.

At the point of time t7, since a lead end of the pixel row 22 is aligned with the tail end of the line $L_\theta$, the pixel row 22 starts an operation of reading the line $L_\theta$. The allocator 102 allocates an H period from the point of time t17 to the point of time t18, as a readout period of the pixel row 22, and the readout circuit 5 reads out image data corresponding to the line $L_\theta$ from the pixel row 22. In this example, the allocator 102 does not allocate an H period from the point of time t12 to the point of time t13, as a readout period of the pixel row 22, because the pixel row 22 during the H period from the point of time t12 to the point of time t13 is located in the line $L_\theta$. Thereafter, the allocator 102 allocates every ten H periods as a readout period of the pixel row 22 to allow the pixel row 22 to read a line whose vertical size is two times of the vertical size of the line in FIG. 8A.

The allocator 102 allocates every ten H periods as a readout period of the pixel rows 23 through 25 in the similar manner as the pixel rows 21 and 22.

As described above, in the case where the vertical resolution is one-half of the maximum value, assuming that the period from the point of time t1 to the point of time t6 is defined as a first frame period, and the first H period in the first frame period is allocated as a readout period of the pixel row 21, allocating the first H period, the third H period, and the fifth H period in the (2j+1)-th frame period, where j is an integer of 0 or larger, as readout periods of the pixel rows 21, 23, and 25, respectively, and allocating the second H period and the fourth H period in the (2j+2)-th frame period as readout periods of the pixel rows 22 and 24, respectively enables to read an image at an identical frame position by the pixel rows 21 through 25. Thereby, image data can be obtained without color displacement.

Arrangement with Six Pixel Rows

In this section, described is an arrangement in the case where the image reading device 1 has six pixel rows i.e. pixel rows 21, 22, 23, 24, 25, and 26. FIGS. 9A and 9B are graphs each showing a relation between lines to be read by the pixel rows 21 through 26, and a time. FIG. 9A shows a case that the vertical resolution is set to the maximum value, and FIG. 9B shows a case that the vertical resolution is set to one-half of the maximum value. In this arrangement, one frame period consists of six H periods.

In FIG. 9A, since the vertical resolution is set to the maximum value, the vertical size of the line $L_\theta$ is equal to the vertical size of one frame. In FIG. 9B, since the vertical resolution is set to one-half of the maximum value, the vertical size of the line $L_\theta$ is two times of the vertical size of one frame.

Referring to FIG. 9A, at the point of time t1, the pixel row 21 starts an operation of reading the line $L_\theta$, at the point of time t2, the pixel row 22 starts an operation of reading the line $L_{\theta-1}$, at the point of time t3, the pixel row 23 starts an operation of reading the line $L_{\theta-2}$, at the point of time t4, the pixel row 24 starts an operation of reading the line $L_{\theta-3}$, at the point of time t5, the pixel row 25 starts an operation of reading the line $L_{\theta-4}$. and at the point of time t6, the pixel row 26 starts an operation of reading the line $L_{\theta-5}$.

At the point of time t7 upon lapse of one frame period after the point of time t1, the allocator 102 allocates an H period from the point of time t7 to the point of time t8, as a readout period of the pixel row 21, and the readout circuit 5 reads out image data corresponding to the line $L_\theta$ from the pixel row 21. At the point of time t7, the pixel row 21 starts an operation of reading the line $L_{\theta+1}$.

Then, at the point of time t8, the allocator 102 allocates an H period from the point of time t8 to the point of time t9, as a readout period of the pixel row 22, and the readout circuit 5 reads out image data corresponding to the line $L_{\theta-1}$ from the pixel row 22. At the point of time t8, the pixel row 22 starts an operation of reading the line $L_\theta$.

The allocator 102 allocates a readout period of the pixel rows 23 through 26 in the similar manner as the pixel rows 21 and 22.

As described above, the allocator 102 allocates the first through the sixth H periods in each of the frame periods, as readout periods of the pixel rows 21 through 26, respectively. This allows the pixel rows 21 through 26 to read an image at an identical frame position, thereby enabling to obtain image data without color displacement.

Next, described is a case where the vertical resolution is set to one-half of the maximum value, referring to FIG. 9B. Referring to FIG. 9B, at the point of time t1, since a lead end of the pixel row 21 is aligned with a tail end of the line $L_\theta$, the pixel row 21 starts an operation of reading the line $L_\theta$. In this example, since the vertical resolution is set to one-half of the maximum value, the allocator 102 allocates an H period from the point of time t13 to the point of time t14, as a succeeding readout period of the pixel row 21, in place of an H period from the point of time t7 to the point of time t8. Thereby, the pixel row 21 is allowed to read the line $L_\theta$ during twelve H periods from the point of time t1 to the point of time t13. Accordingly, the vertical size of the line $L_\theta$ is two times of the vertical size of the line $L_\theta$ in FIG. 9A, and the vertical resolution is one-half of the vertical resolution in FIG. 9A. Thereafter, the allocator 102 allocates every twelve H periods as a readout period of the pixel row 21 to allow the pixel row 21 to read a line whose vertical size is two times of the vertical size of the line in FIG. 9A.

At the point of time t8, since a lead end of the pixel row 22 is aligned with the tail end of the line $L_\theta$, the pixel row 22 starts an operation of reading the line $L_\theta$. The allocator 102 allocates an H period from the point of time t20 to the point of time t21, as a readout period of the pixel row 22, and the readout circuit 5 reads out image data corresponding to the line $L_\theta$ from the pixel row 22. In this example, the allocator 102 does not allocate an H period from the point of time t14 to the point of time t15, as a readout period of the pixel row 22, because the pixel row 22 during the H period from the point of time t14 to the point of time t15 is located in the line $L_\theta$. Thereafter, the allocator 102 allocates every twelve H periods as a readout period of the pixel row 22 to allow the pixel row 22 to read a line whose vertical size is two times of the vertical size of the line in FIG. 9A.

The allocator 102 allocates every twelve H periods as a readout period of the pixel rows 23 through 26 in the similar manner as the pixel rows 21 and 22.

As described above, in the case where the vertical resolution is one-half of the maximum value, assuming that the period from the point of time t1 to the point of time t7 is defined as a first frame period, and the first H period in the first frame period is allocated as a readout period of the pixel row 21, allocating the first H period, the third H period, and the fifth H period in the (2j+1)-th frame period, where j is an integer of 0 or larger, as readout periods of the pixel rows 21, 23, and 25, respectively, and allocating the second H period, the fourth H period, and the sixth H period in the (2j+2)-th frame period as readout periods of the pixel rows 22, 24, and 26, respectively enables to read an image at an identical frame position by the pixel rows 21 through 26. Thereby, image data can be obtained without color displacement.

The relation between the number of pixel rows, and the readout periods of the pixel rows may be generalized as follows. In the case where an allocating operation is started from the k-th pixel row (where $1 \leq k \leq i$) in the first frame period, assuming that "i" is the number of pixel rows, and the vertical resolution is 1/m of the maximum value, the allocator 102 is operable to allocate the (k+q−1+j*m)-th H period in the (m*p+q)-th frame period, as an image data readout period of the (k+q−1+j*m)-th pixel row, where p, q is a variable for defining the ordinal number of the frame period, p is an integer of 0 or larger, q is an integer satisfying the relation: $1 \leq q \leq m$, and j is an integer of 0 or larger, and satisfies the relation: $k+q-1+j*m \leq i$.

In the following, specific examples are described.

EXAMPLE 1

In the case where i=3, m=2, and k=1, in other words, in the case where the pixel rows are three pixel rows i.e. the first through the third pixel rows, the vertical resolution is one-half of the maximum value, and an allocating operation is started from the first pixel row, the ordinal number of the pixel row in each of the frame periods, from which image data is to be read out, is defined as follows.

i) In the case of the first frame period (p=0, q=1), the first H period and the third H period are allocated as a readout period.

In this case, k+q−1+j*m=1+j*2, and the integer "j" which satisfies the relation: $1+j*2 \leq 3$ is 0 or 1. Accordingly, 1+j*2=1 or 3. This means that in the first frame period, the first H period is allocated as an image data readout period of the first pixel row, and the third H period is allocated as an image data readout period of the third pixel row.

ii) In the case of the second frame period (p=0, q=2), the second H period is allocated as a readout period.

In this case, $k+q-1+j*m=2+j*2$, and the integer "j" which satisfies the relation: $2+j*2\leq 3$ is 0. Accordingly, $2+j*2=2$. This means that in the second frame period, the second H period is allocated as an image data readout period of the second pixel row.

iii) In the case of the third frame period (p=1, q=1), the first H period and the third H period are allocated as a readout period.

In this case, $k+q-1+j*m=1+j*2$, and the integer "j" which satisfies the relation: $1+j*2\leq 3$ is 0 or 1. Accordingly, $1+j*2=1$ or 3. This means that in the third frame period, the first H period is allocated as an image data readout period of the first pixel row, and the third H period is allocated as an image data readout period of the third pixel row.

EXAMPLE 2

In the case where i=3, m=4, and k=1, in other words, in the case where the pixel rows are three pixel rows i.e. the first through the third pixel rows, the vertical resolution is one-fourth of the maximum value, and an allocating operation is started from the first pixel row, the ordinal number of the pixel row in each of the frame periods, from which image data is to be read out, is defined as follows.

i) In the case of the first frame period (p=0, q=1), the first H period is allocated as a readout period.

In this case, $k+q-1+j*m=1+j*4$, and the integer "j" which satisfies the relation: $1+j*4\leq 3$ is 0. Accordingly, $1+j*4=1$. This means that in the first frame period, the first H period is allocated as an image data readout period of the first pixel row.

ii) In the case of the second frame period (p=0, q=2), the second H period is allocated as a readout period.

In this case, $k+q-1+j*m=2+j*4$, and the integer "j" which satisfies the relation: $2+j*4\leq 3$ is 0. Accordingly, $2+j*4=2$. This means that in the second frame period, the second H period is allocated as an image data readout period of the second pixel row.

iii) In the case of the third frame period (p=0, q=3), the third H period is allocated as a readout period.

In this case, $k+q-1+j*m=3+j*4$, and the integer "j" which satisfies the relation: $3+j*4\leq 3$ is 0. Accordingly, $3+j*4=3$. This means that in the third frame period, the third H period is allocated as an image data readout period of the third pixel row.

iv) In the case of the fourth frame period (p=0, q=4), no H period is allocated as a readout period.

In this case, $k+q-1+j*m=4+j*4$, and there is no integer "j" which satisfies the relation: $4+j*4\leq 3$. This means that in the fourth frame period, no H period is allocated as an image data readout period of the first through the third pixel rows.

iv) In the case of the fifth frame period (p=1, q=1), the first H period is allocated as a readout period.

In this case, $k+q-1+j*m=1+j*4$, and the integer "j" which satisfies the relation: $1+j*4\leq 3$ is 0. Accordingly, $1+j*4=1$. This means that in the fifth frame period, the first H period is allocated as an image data readout period of the first pixel row.

EXAMPLE 3

In the case where i=4, m=2, and k=1, in other words, in the case where the pixel rows are four pixel rows i.e. the first through the fourth pixel rows, the vertical resolution is one-half of the maximum value, and an allocating operation is started from the first pixel row, the ordinal number of the pixel row in each of the frame periods, from which image data is to be read out, is defined as follows.

i) In the case of the first frame period (p=0, q=1), the first H period and the third H period are allocated as a readout period.

In this case, $k+q-1+j*m=1+j*2$, and the integer "j" which satisfies the relation: $1+j*2\leq 4$ is 0 or 1. Accordingly, $1+j*2=1$ or 3. This means that in the first frame period, the first H period is allocated as an image data readout period of the first pixel row, and the third H period is allocated as an image data readout period of the third pixel row.

ii) In the case of the second frame period (p=0, q=2), the second H period and the fourth H period are allocated as a readout period.

In this case, $k+q-1+j*m=2+j*2$, and the integer "j" which satisfies the relation: $2+j*2\leq 4$ is 0 or 1. Accordingly, $2+j*2=2$ or 4. This means that in the second frame period, the second H period is allocated as an image data readout period of the second pixel row, and the fourth H period is allocated as an image data readout period of the fourth pixel row.

iii) In the case of the third frame period (p=1, q=1), the first H period and the third H period are allocated as a readout period.

In this case, $k+q-1+j*m=1+j*2$, and the integer "j" which satisfies the relation: $1+j*2\leq 4$ is 0 or 1. Accordingly, $1+j*2=1$ or 3. This means that in the third frame period, the first H period is allocated as an image data readout period of the first pixel row, and the third H period is allocated as an image data readout period of the third pixel row.

iv) In the case of the fourth frame period (p=0, q=2), the second H period and the fourth H period are allocated as a readout period.

In this case, $k+q-1+j*m=1+j*2$, and the integer "j" which satisfies the relation: $2+j*2\leq 4$ is 0 or 1. Accordingly, $2+j*2=2$ or 4. This means that in the fourth frame period, the second H period is allocated as an image data readout period of the second pixel row, and the fourth H period is allocated as an image data readout period of the fourth pixel row.

The following is a summary of the technical features of the embodiment.

(1) The image reading device is an image reading device is an image reading device for scanning a document by causing a relative movement between the document, and a given number (i) of pixel rows, where i is an integer of 2 or larger, in a vertical direction orthogonal to a horizontal direction, each of the pixel rows being formed by arranging a certain number of pixels in the horizontal direction. Each of the pixel rows has a pitch in the vertical direction equal to or larger than (i+1)/i of a size of an opening of the pixel in the vertical direction. The image reading device includes: a readout circuit, provided in common with respect to the pixel rows, for reading out image data; a resolution setter for setting a vertical resolution in scanning the document; and a controlling section for allocating a predetermined H period as a readout period of each of the pixel rows so that each of the pixel rows reads an identical line of the document, depending on the vertical resolution set by the resolution setter, assuming that a period when a relative movement of each of the pixel rows by a distance equal to the size of the opening of the pixel in the vertical direction is made is defined as one frame period, and the one frame period is divided into the given number (i) of H periods.

According to the above arrangement, the predetermined H period is allocated as the readout period of each of the pixel rows so that each of the pixel rows is allowed to read the identical line of the document, depending on the vertical resolution set by the resolution setter. This enables to obtain image data without color displacement, even if the vertical resolution is changed.

(2) Preferably, the resolution setter may be operable to set the vertical resolution to 1/m of a maximum value of the vertical resolution, where m is an integer of 2 or larger, and the controlling section may be operable to allocate the (k+q−1+j*m)-th H period in the (m*p+q)-th frame period, as the readout period of the (k+q−1+j*m)-th pixel row, in the case where the allocating operation is started from the k-th pixel row (where $1 \leq k \leq i$) in the first frame period, where p, q is a variable for defining the ordinal number of the frame period, p is an integer of 0 or larger, q is an integer satisfying a relation: $1 \leq q \leq m$, and j is an integer of 0 or larger, and satisfies a relation: $k+q-1+j*m \leq i$.

According to the above arrangement, even if the vertical resolution is changed, image data can be securely read out without color displacement.

(3) Preferably, the image reading device may further include a horizontal scanning circuit for scanning each of the pixel rows in the horizontal direction; and a vertical scanning circuit for scanning each of the pixel rows in the vertical direction.

According to the above arrangement, each of the pixels is designated by the horizontal scanning circuit and the vertical scanning circuit, and image data can be read out accordingly. This enables to precisely read out image data from each of the pixels.

(4) Preferably, the vertical scanning circuit may be constituted of a shift register. According to this arrangement, since the vertical scanning circuit is constituted of the shift register, the vertical scanning circuit can be constructed with a simplified configuration.

(5) Preferably, the vertical scanning circuit may be constituted of a random access circuit. According to this arrangement, since the vertical scanning circuit is constituted of the random access circuit, the order of vertical scanning of the pixel rows can be desirably changed, without changing the order of the pixel rows.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading device for scanning a document by causing a relative movement between the document, and a given number (i) of pixel rows, where i is an integer of 2 or larger, in a vertical direction orthogonal to a horizontal direction, each of the pixel rows being formed by arranging a certain number of pixels in the horizontal direction, and each of the pixel rows having a pitch in the vertical direction equal to or larger than (i+1)/i of a size of an opening of the pixel in the vertical direction, the image reading device comprising:

a readout circuit, provided in common with respect to the pixel rows, for reading out image data;

a resolution setter for setting a vertical resolution in scanning the document; and a controlling section for allocating a predetermined H period as a readout period of each of the pixel rows so that each of the pixel rows reads an identical line of the document, depending on the vertical resolution set by the resolution setter, assuming that a period when a relative movement of each of the pixel rows by a distance equal to the size of the opening of the pixel in the vertical direction is made is defined as one frame period, and the one frame period is divided into the given number (i) of H periods.

2. The image reading device according to claim 1, wherein the resolution setter is operable to set the vertical resolution to 1/m of a maximum value of the vertical resolution, where m is an integer of 2 or larger, and the controlling section is operable to allocate the (k+q−1+j*m)-th H period in the (m*p+q)-th frame period, as the readout period of the (k+q−1+j*m)-th pixel row, in the case where the allocating operation is started from the k-th pixel row (where $1 \leq k \leq i$) in the first frame period, where p, q is a variable for defining the ordinal number of the frame period, p is an integer of 0 or larger, q is an integer satisfying a relation: $1 \leq q \leq m$, and j is an integer of 0 or larger, and satisfies a relation: $k+q-1+j*m \leq i$.

3. The image reading device according to claim 2, further comprising:

a horizontal scanning circuit for scanning each of the pixel rows in the horizontal direction; and a vertical scanning circuit for scanning each of the pixel rows in the vertical direction.

4. The image reading device according to claim 3, wherein the vertical scanning circuit is constituted of a shift register.

5. The image reading device according to claim 3, wherein the vertical scanning circuit is constituted of a random access circuit.

6. The image reading device according to claim 1, further comprising:

a horizontal scanning circuit for scanning each of the pixel rows in the horizontal direction; and a vertical scanning circuit for scanning each of the pixel rows in the vertical direction.

7. The image reading device according to claim 6, wherein the vertical scanning circuit is constituted of a shift register.

8. The image reading device according to claim 6, wherein the vertical scanning circuit is constituted of a random access circuit.

9. A method for driving an image reading device for scanning a document by causing a relative movement between the document, and a given number (i) of pixel rows, where i is an integer of 2 or larger, in a vertical direction orthogonal to a horizontal direction, each of the pixel rows being formed by arranging a certain number of pixels in the horizontal direction, each of the pixel rows having a pitch in the vertical direction equal to or larger than (i+1)/i of a size of an opening of the pixel in the vertical direction, and the image reading device including a readout circuit, provided in common with respect to the pixel rows, for reading out image data, the method comprising:

a resolution setting step of setting a vertical resolution in scanning the document; and an allocating step of allocating a predetermined H period as a readout period of each of the pixel rows so that each of the pixel rows reads an identical line of the document, depending on the vertical resolution set in the resolution setting step, assuming that a period when a relative movement of each of the pixel rows by a distance equal to the size of the opening of the pixel in the vertical direction is made is defined as one frame period, and the one frame period is divided into the given number (i) of H periods.

* * * * *